July 6, 1937.    J. N. REYNOLDS    2,086,136
METHOD OF MANUFACTURING SWITCHES
Filed Sept. 20, 1934    6 Sheets-Sheet 1
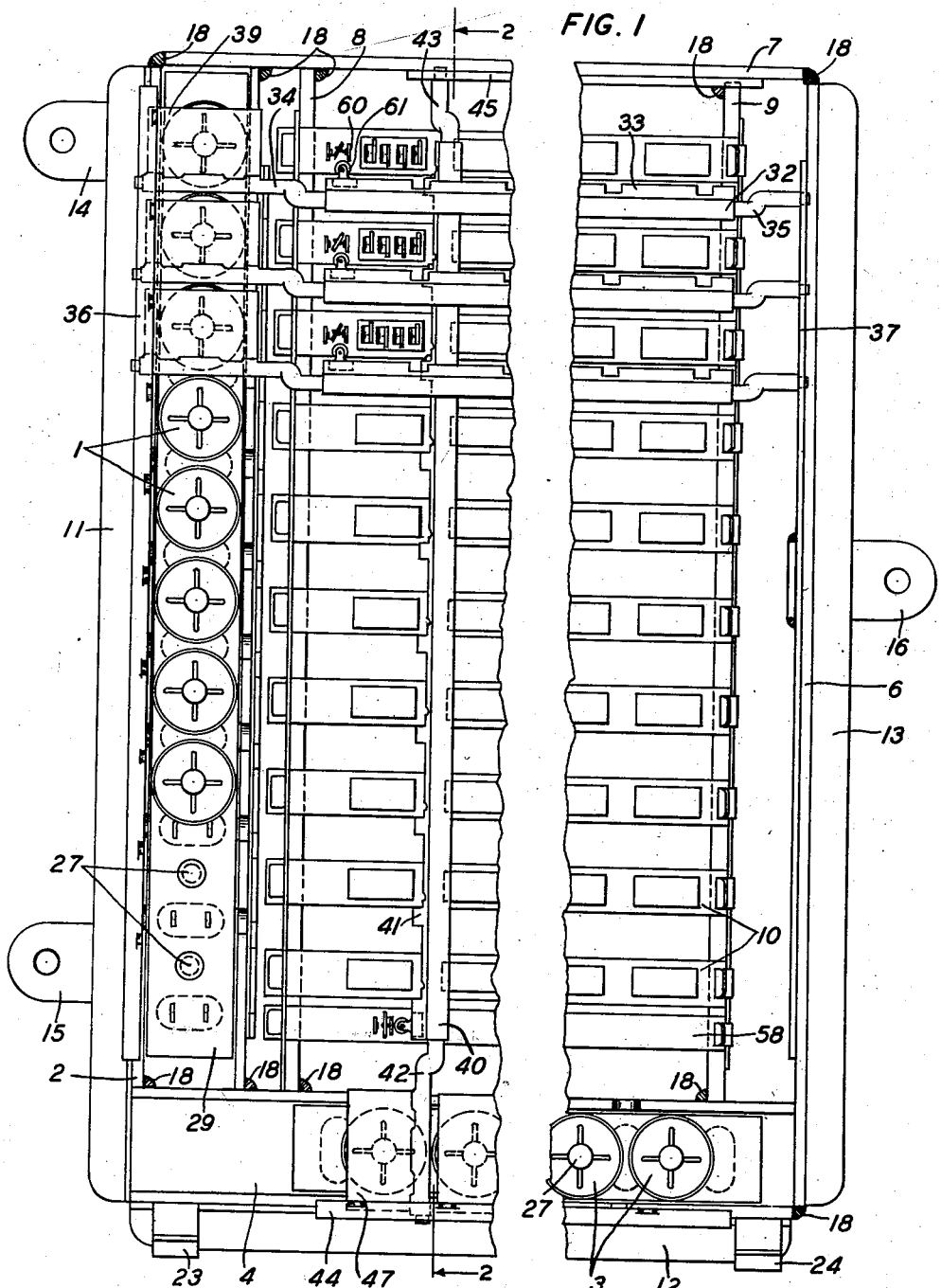
INVENTOR
J. N. REYNOLDS
BY
M. R. McKinney
ATTORNEY July 6, 1937.  J. N. REYNOLDS  2,086,136
METHOD OF MANUFACTURING SWITCHES
Filed Sept. 20, 1934  6 Sheets-Sheet 2
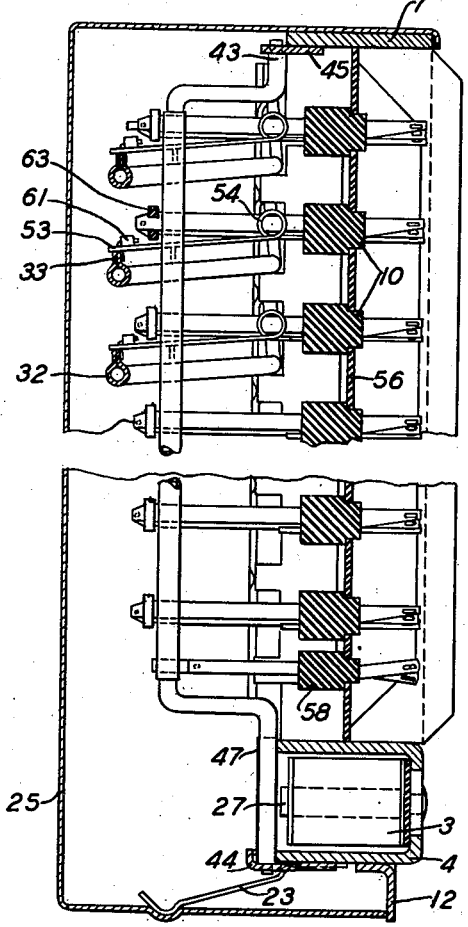
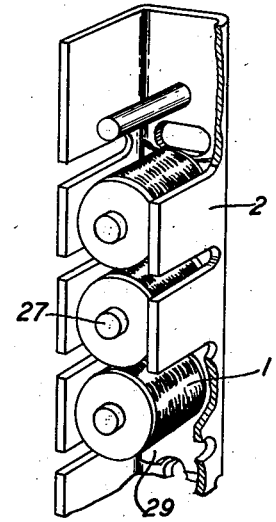
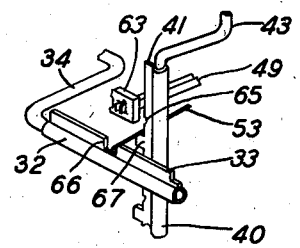
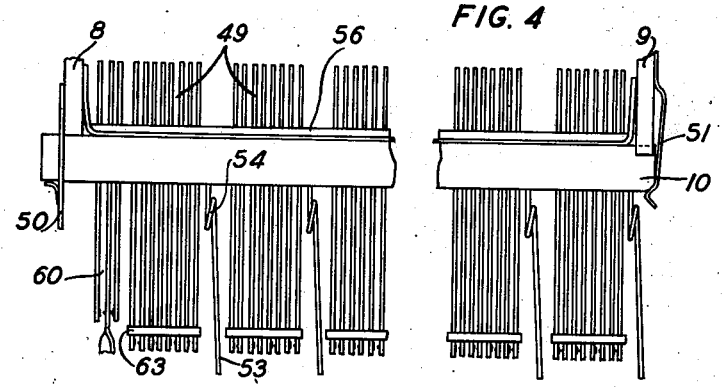
INVENTOR
J. N. REYNOLDS
BY
M. C. McKenney
ATTORNEY INVENTOR
J. N. REYNOLDS
BY
M. McKenney
ATTORNEY

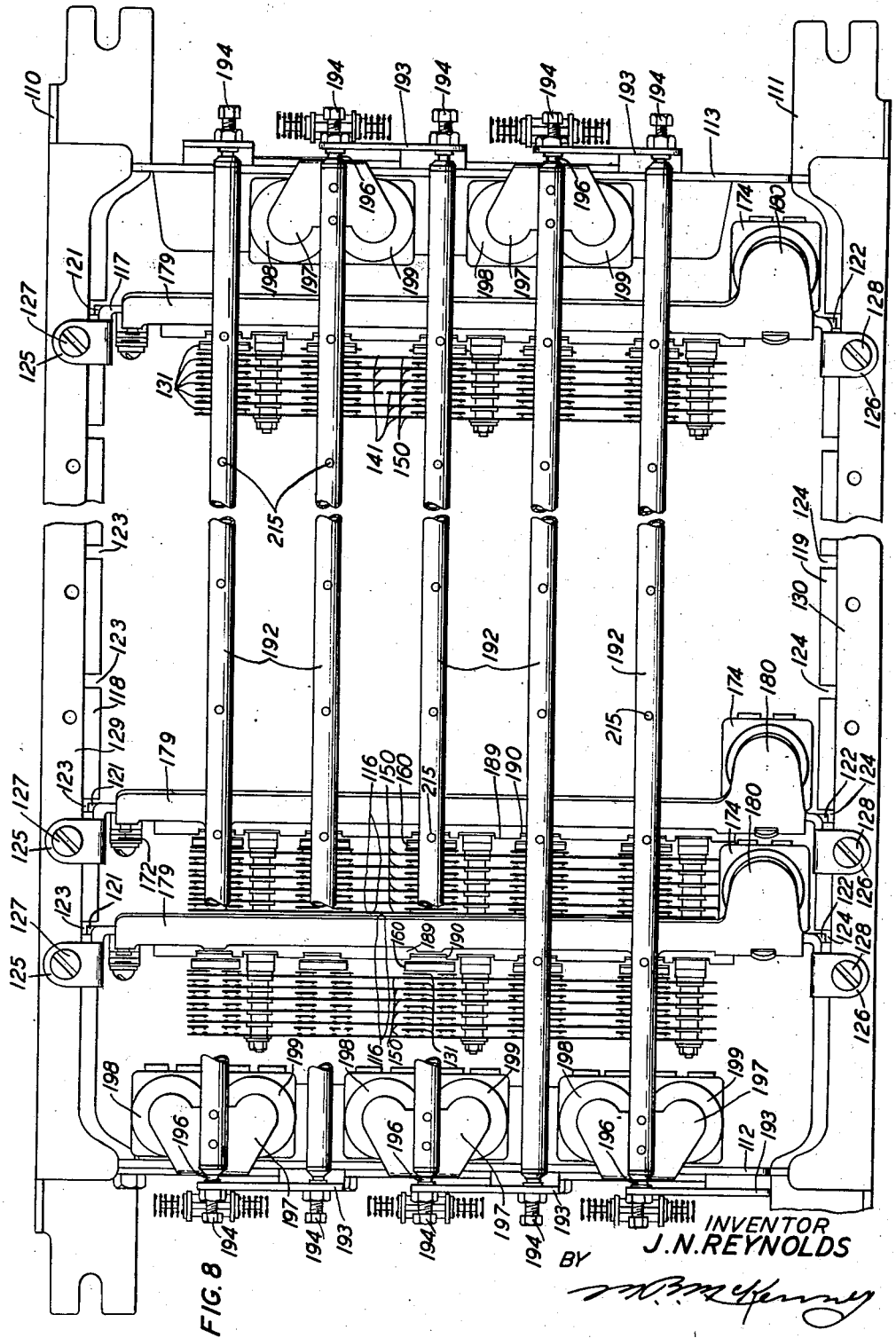

July 6, 1937.  J. N. REYNOLDS  2,086,136
METHOD OF MANUFACTURING SWITCHES
Filed Sept. 20, 1934  6 Sheets-Sheet 5
FIG. 9
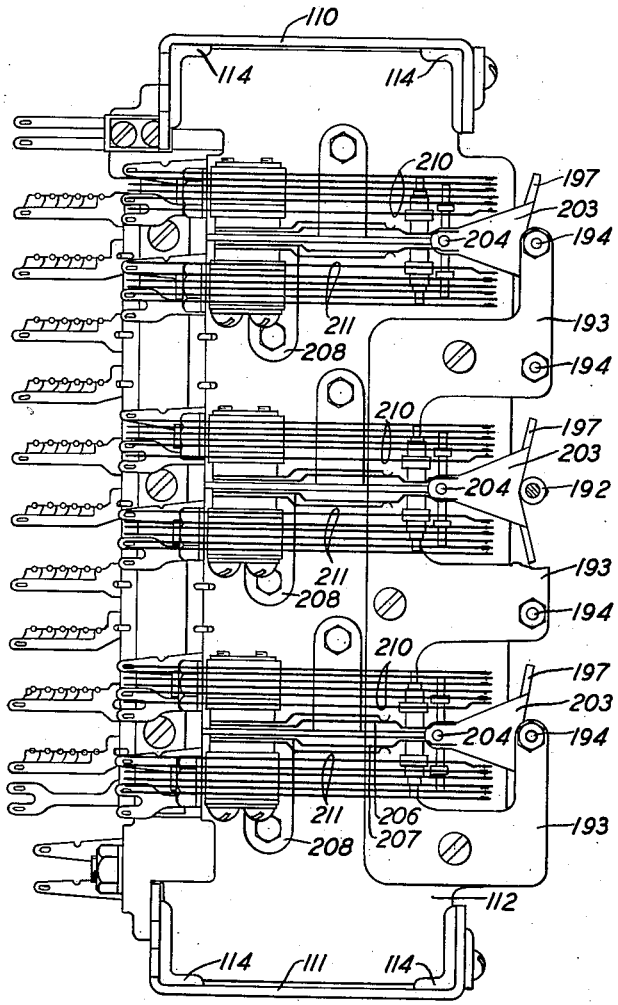
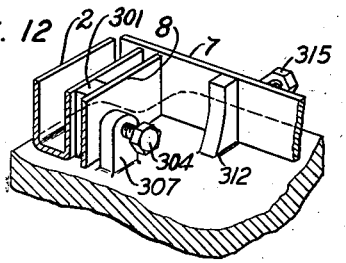
FIG. 13
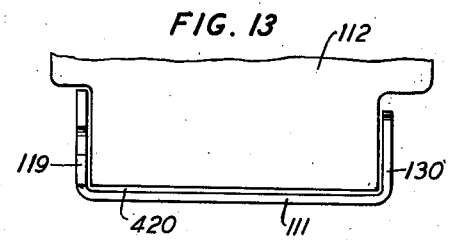
INVENTOR
J. N. REYNOLDS
BY
ATTORNEY July 6, 1937.  J. N. REYNOLDS  2,086,136
METHOD OF MANUFACTURING SWITCHES
Filed Sept. 20, 1934   6 Sheets-Sheet 6
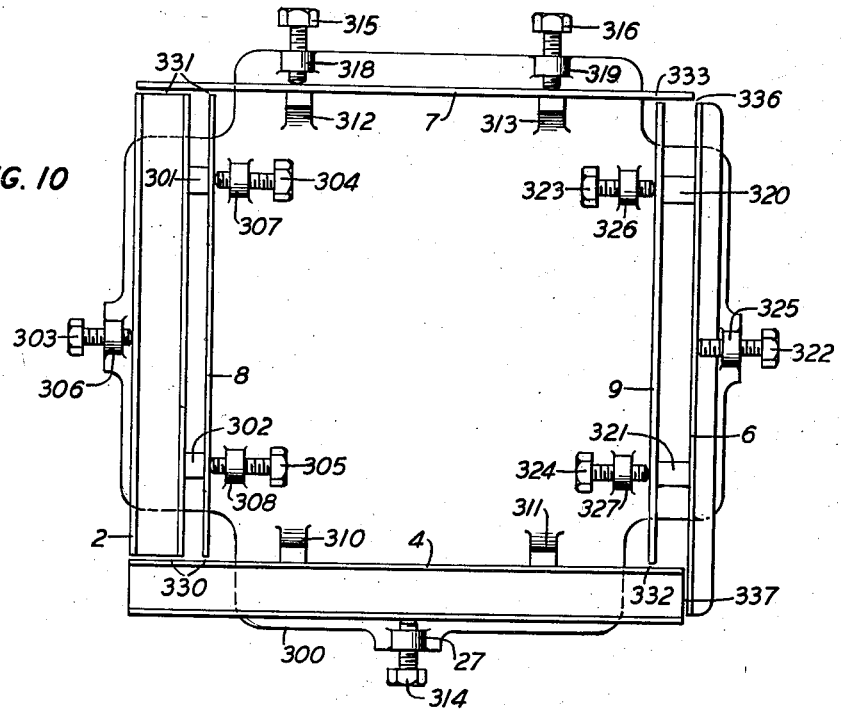
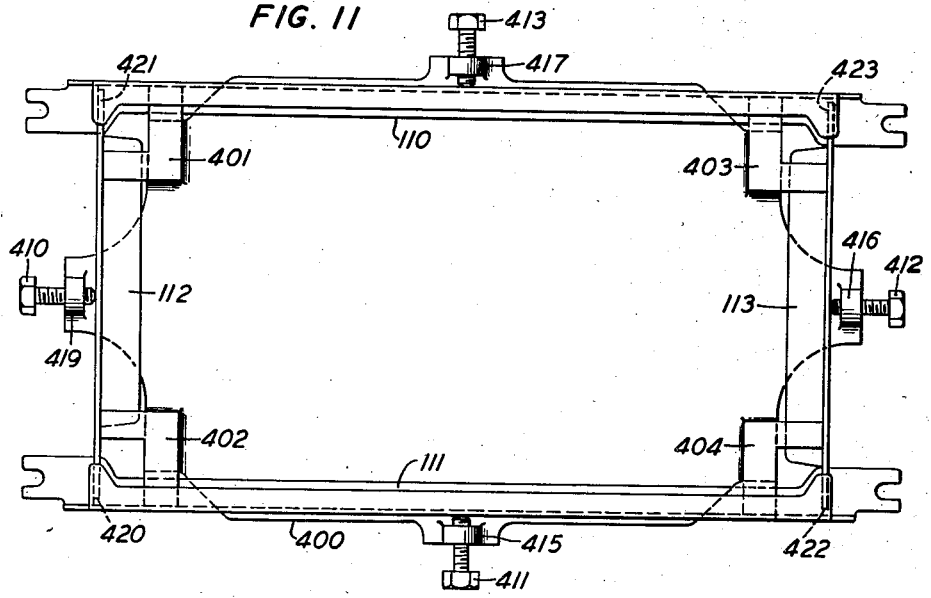
INVENTOR
J. N. REYNOLDS
BY
ATTORNEY Patented July 6, 1937

2,086,136

UNITED STATES PATENT OFFICE 2,086,136

METHOD OF MANUFACTURING SWITCHES

John N. Reynolds, Princeton, N. J., assignor to Bell Telephone Laboratories, Incorporated, New York, N. Y., a corporation of New York Application September 20, 1934, Serial No. 744,778 In Canada October 18, 1933

4 Claims. (Cl. 29—155.5)

This invention relates to improvements in methods of manufacture and particularly to methods of manufacturing switching mechanisms of the cross-bar type.

The object of the invention is to simplify the construction of switches of this kind to reduce the cost of manufacturing.

The present application is a continuation in part of the applicant's application Serial No. 641,214, filed November 4, 1932, granted as Patent 2,040,334, May 12, 1936.

Cross-bar switches of the type to which this invention is applicable may embody the general principles disclosed in the applicant's Patent 1,139,722 of May 18, 1915. In such switches, sets of intersecting bars are employed, one set for each outgoing line and one set for each incoming line together with contact strips located adjacent the intersections of the bars with means whereby the displacement of two intersecting bars causes electrical connections to be established between an incoming and an outgoing line through the contacts of a set located at a cross-point of said two operated bars.

The invention is applicable to switch structures of the kind disclosed in the applicant's above mentioned Patent 2,040,334 in which the frame is shown comprising magnet structures each including a row of operating magnets and a common pole-piece and metal strips welded together. One form of the construction of the frame may be an arrangement where two magnet structures provide respectively a vertical and a horizontal side of the frame and two metal strips provide the two other sides of the frame. Another form may be a frame in which two opposite or vertical sides are formed by vertical magnet structures and in which one horizontal side is formed by a horizontal magnet structure and the other horizontal side is formed by a metal strip.

A feature of this invention lies in the method of manufacturing frames of this kind. This method consists in so shaping the frame members that when heat is applied for welding, warping or distortion of the original form is avoided and in cutting the length of the sides whether they consist of magnet structures or metal strips to such dimensions within ordinary commercial limits, that when the sides are in their proper positions to form the frame, a slight space appears between the adjacent edges of the sides and pockets are formed at the places where they are to be welded together, placing these sides in a jig fixture and then welding the adjacent edges of the sides together with the welding fluid applied in said pockets. A frame structure having exactly the desired inside and outside dimensions is thereby secured without having to cut the length of the sides to very accurate measurements.

This method of manufacture may be applied to other frame structure such as, for example, the frame disclosed in the applicant's Patent 2,021,329, granted November 19, 1935 on an application Serial No. 702,453, filed December 15, 1933, comprising an upper and a lower U-shaped frame member with the sides thereof facing inwardly and two L-shaped side members with their sides turned inwardly and with the upper and lower frame members cut slightly longer than the distance between the side members and with the side members cut shorter than the distance between the upper and lower members. This provides a pocket or seat for the welding fluid at the points where the frame members are joined together. These pockets are so located that when the welding fluid is applied therein it will not interfere with the proper location or working of the switching unit to be placed in said frame. These shapes of the frame members assures that heat applied when welding the members together will not cause warping or distortion of the frame members. The various working surfaces on the frame members are therefore maintained in their accurately determined relation to each other.

Referring to the drawings, Fig. 1 shows a front view of a cross-bar switch embodying the features of this invention with but a few intersecting operating bars shown for the sake of clearness;

Fig. 2 is a cross-section taken on the line 2—2 of Fig. 1 with but one vertical and three horizontal intersecting operating bars shown for the sake of clearness;

Fig. 3 is a fragmentary perspective of a relay unit of operating magnets in their common pole-piece;

Fig. 4 is a top view of one of the detachable contact strips;

Fig. 5 is a fragmentary perspective of a horizontal and a vertical intersecting operating bar and a portion of a set of springs and intercepting finger to show the manner in which these bars cooperate to establish circuit connections;

Figure 7:
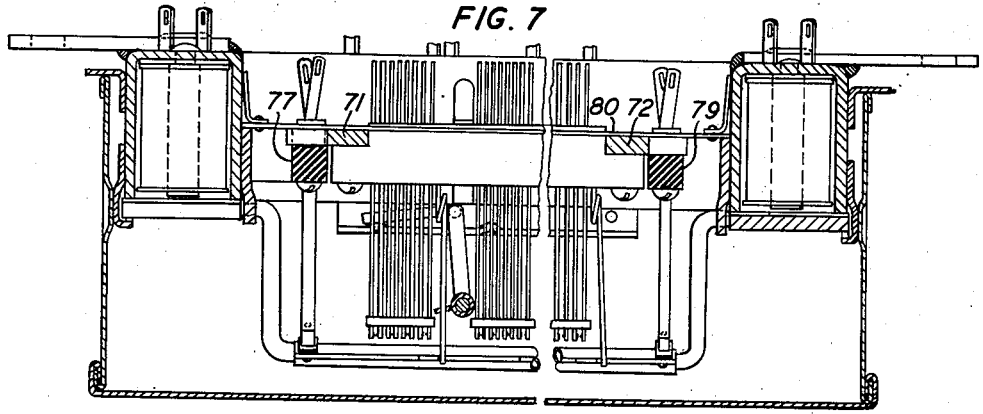
Figure 6:
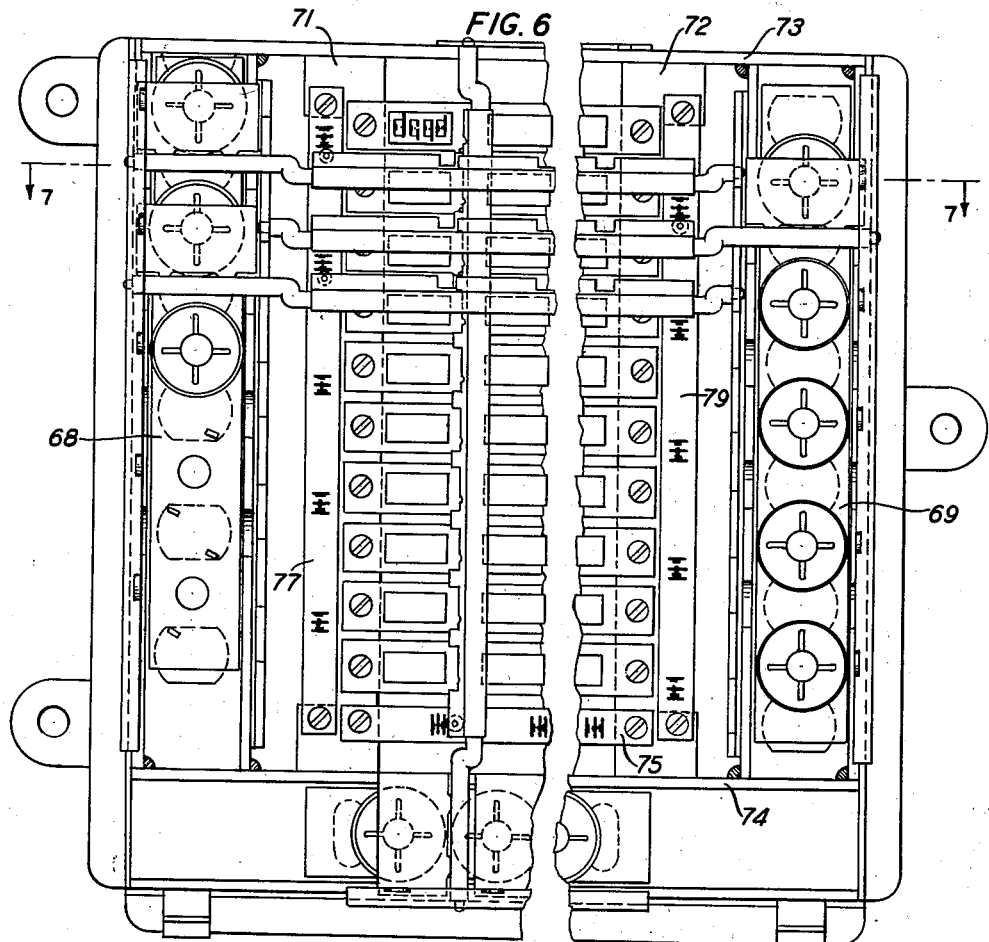

Fig. 6 is a front view of a modified form of a cross-bar switch embodying features of this invention with the vertical operating magnets in their common pole-piece structures arranged to form the left and right sides of the frame structure; and Fig. 7 is a cross-section taken on the line 7—7 of Fig. 6 showing a contact strip, a vertical and a horizontal intersecting operating bar and the associated operating mechanism.

Fig. 8 is a front view of a modified form of a cross-bar switch embodying the features of this invention;

Fig. 9 shows a left-hand side view of the switch shown in Fig. 8;

Fig. 10 shows a jig fixture with the frame members of the switch shown in Fig. 1 arranged in their proper places ready for spot welding in accordance with the features of this invention;

Fig. 11 shows the frame members of the switch shown in Fig. 8 placed in a jig fixture ready for spot welding in accordance with the features of this invention;

Fig. 12 is a fragmentary perspective view of one corner of the jig fixture and the frame members located as shown in Fig. 10;

Fig. 13 is a fragmentary right-hand end view of the frame members shown in Fig. 11 placed in their proper positions ready for welding in accordance with the features of this invention.

Referring now to Fig. 1, the frame structure for the switch consists of a row of vertical operating magnets 1 in their common pole-piece structure 2, a corresponding row of horizontal operating magnets 3 in their common pole-piece structure 4, and corresponding vertical and horizontal frame members 6 and 7. This frame also consists of two vertical plates or partitions 8 and 9 on which the contact strips such as 10 are mounted. To the pole-pieces for the horizontal and vertical operating magnets and the right-hand frame member 6 are secured angle-iron strips 11, 12 and 13, respectively, to serve as back rest for a dust-proof cover shown in Fig. 2. To the pole-piece 2 and frame member 6 are also secured lugs 14, 15 and 16 for mounting the cross-bar switch to the usual mounting rack or frame in an exchange. To the pole-piece 4 are secured springs 23 and 24 for the securing of the dust-proof cover 25 over the switch structure.

This cross-bar switch frame structure may be manufactured by cutting the pole-pieces 2 and 4, the frame members 7 and 6, and partitions 8 and 9 to dimensions within ordinary commercial limits and slightly shorter than the desired measurements of the frame. These members are then placed in a suitable jig fixture and welded together. The jig fixture will thereby locate the various parts of the frame within very close limits without having the frame members cut to very exact dimensions. The welding may be done at such places as are marked with the numeral 18.

The vertical and horizontal magnet structures 1, 2 and 3, 4 may be of the general construction as shown in my Patent 1,958,640 granted May 15, 1934. In general, the magnet structure comprises a U-shaped common pole-piece in which cores 27 are welded to the central portion. Over these cores are slipped form wound windings, such as 1 and 3, which may be held in place by suitable washers. On the inside of these central portions of the common pole-pieces are placed insulation strips 29 through which the terminals of the windings may be extended through suitable slots in the central portion of the pole-pieces to the back of the frame structure.

The horizontal operating bars may comprise a tubing 32 having projections 33 at right angles and at the ends of this tubing S-shaped rods 34 and 35 are mounted in bearing plates 36 and 37 secured respectively to the common pole-piece 2 and the frame member 6 by welding. To the S-shaped member 35 is welded the armature 39 in position over the corresponding operating magnet. The vertical operating bars are constructed in the same manner as the horizontal operating bars each comprising a tubing 40 with projections 41 and the S-shaped members 42 and 43 rotatably mounted on the bearing plates 44 and 45 welded respectively to the frame member 7 and the common pole-piece 4. To the vertical operating bar is welded the armature 47 in position to be attracted by the corresponding operating magnet.

The contact strips 10 comprise molded bars of insulation material in which are molded the groups of contact springs 49. These contact strips are mounted between the vertical partitions 8 and 9 and secured in front of and to these plates by means of springs 50 and 51. In each contact strip and associated with each group of contact springs there is an obstruction finger 53 molded into the contact strip. These fingers 53 may be formed in a loop 54 near the point at which they are secured to make them more flexible in any direction. Behind the contact strips is mounted an insulating plate 56 to cover the entire back of the switch structure between the plates 8 and 9. These plates are provided with apertures through which lugs in the contact strips and the operating springs project for making the necessary connections. At the bottom of the regular contact strips is mounted a special contact strip 58 in which contacts are placed in position to be operated, one set by each vertical bar and similarly in each of the regular contact strips is located a special series of contacts 60 to be operated by a roller 61 on each corresponding horizontal bar. These contacts may be called off-normal contacts and may be used for various circuit connections to be made each time a vertical and a horizontal bar is operated. Each set of operating springs is provided with an insulation plate 63 to which every other spring of a group may be attached, so that when this plate is moved the contact springs connected to it will all be moved in unison to make electrical connection with the associated free spring projecting through apertures in the plates.

The operation of this cross-bar switch may be explained as follows, referring specially to Fig. 5. The operation of a set of contacts is established by the operation of a vertical bar and a horizontal bar. The obstruction finger 53 rests in the corner formed by lug 67 on projection 41 and the horizontal bar is operated first to place this obstruction finger 53 between the projection 41 in front of a notch 65 thereon and the plate 63. Then the vertical bar is operated to move the obstruction finger horizontally to force the plate 63 towards the left thus causing electrical contacts to be established between the springs controlled by plate 63. The vertical bars are now held in this operated position to maintain the obstruction finger in the notch 65 and to maintain the electrical connection between the associated spring contacts and the horizontal bar is released. If the same horizontal bar is operated again to make another connection at a closing point between this bar and another vertical bar, the obstruction finger 53 held by the vertical operating bar will not be touched or affected as the projection 33 on the horizontal bar is provided with a notch 66 which is so placed as to permit the horizontal bar to be operated without disturbing the obstruction finger 53 when engaged by the vertical bar. When the connection is to be released the vertical bar operated will return to normal position and thus permit the obstruction finger to be returned to rest on a lug 67 against projection 41. The tension on the obstruction finger 53 is such that it will always return to this position.

The modified form of the cross-bar switch shown in Figs. 6 and 7 is identical in construction to that shown in Figs. 1 to 5 except that the vertical operating magnets are divided in two groups, the operating magnet for every other horizontal operating bar being placed on opposite sides in two separate magnet structures 68 and 69. For example, the first, third, fifth, etc. horizontal operating bars are controlled by the magnet in the unit 68, while the second, fourth, sixth, etc. are controlled by magnets in the unit 69. In these constructions of a cross-bar switch the magnet structure 69 takes the place of the frame member 6 of the cross-bar switch shown in Figs. 1 and 5. In this modified form the arrangement of the contact strips is also somewhat different in that they are secured by means of screws to vertically placed partitions 71 and 72 which are secured by welding to the upper frame member 73 and the horizontal operating magnet structure 74. The strip 75 for the off-normal contacts controlled by the vertical bars is secured in the same manner as the other contact strips while the off-normal contact strip 77 for the odd numbered horizontal operating bars is secured at the top and bottom of the vertical partition 71 and the off-normal contact strip 79 for the even numbered horizontal operating bars is secured at the top and bottom to the partition 72. Behind the contact strips is placed an insulation plate 80 having apertures through which the contacts may project for connection.

Referring now to the drawings Figs. 8 and 9 which show another frame structure disclosed in the applicant's Patent 2,021,329 mentioned above, a brief description will be made thereof and for further details reference may be made to the specification and drawings of said copending application. The structure comprises a frame including a U-shaped upper horizontal frame member 110 and a U-shaped lower horizontal frame member 111 and vertical side frame members 112 and 113, said side members being of L-shaped cross-section and welded to the horizontal frame members 10 and 11 at points 114. The sides of the horizontal frame members 110 and 111 and one side of the L-shaped vertical frame members are turned inward towards the center of the switch structure. Between the horizontal frame members 110 and 111 are mounted vertical assembly units 116. Each of these units comprises a vertical plate 117 secured to the rear sides 118 and 119 of the upper and lower horizontal frame members 110 and 111 by means of lugs 121 and 122 engaging slots 123 and 124, respectively, in said sides 118 and 119. The plate 117 is fastened in the front to the front sides of the horizontal frame members 110 and 111 by means of bent lugs 125 and 126 on said plate 117 secured by means of screws 127 and 128 to the front sides 129 and 130, respectively. On each of these plates 117 is insulatedly mounted at the rear thereof a series of ten sets of horizontal spring contact strips 131. At the front portion of plate 117 is insulatedly secured a group of vertical contact strips 141. Each vertical strip is provided with projections or contact making portions 150 which register with contacts on the corresponding horizontal strips 131 that extend between adjacent projections 150 to make connections between corresponding vertical and horizontal strips when the horizontal strips are operated.

On each plate 117 there is mounted at the bottom an operating magnet 174. On the plate 17 is also mounted the corresponding vertical bar 179 having an L-shaped cross-section and a projecting armature 180 positioned to be attracted by the core of the magnet 74 to rotate the bar 179. The vertical bar 179 is mounted to rock on an edge of the plate 117. The upper end of the vertical bar 179 is provided with an angular projection that engages a stud on the off-normal springs 172 to cause the operation of these springs when the bar 179 is rotated. The side of the vertical bar 79 projecting inwardly in a more or less parallel position in relation to the plate 117 is provided with prongs or projections which are connected to a vertical member 189. This member is secured at a right angle to the projections and is provided with slots 190 for the operation of the switch as will presently be described. The horizontal bars 192 are mouned in front of the vertical bars on brackets 193 secured to the vertical L-shaped side members 112 and 113 of the frame. Bearing screws 194 secured in the brackets 193 extend into bearing sleeves 196 secured to the ends of the horizontal bars 192 for the rotation of the bars. The upper horizontal bar 192, referring to Fig. 8, has its armature 197 secured at its left-hand end while the remaining bars have their armatures secured at alternate opposite ends. This armature 197 extends upwardly and downwardly from the bar 192 in front of the cores of an upper and a lower magnet 198 and 199 to cause the horizontal bar 192 to be rotated in a clockwise direction by magnet 198 and in a counter-clockwise direction by the magnet 199. Each bar is therefore controlled by two magnets. These magnets are mounted in pairs on the inwardly projecting side of the L-shaped vertical frame members 112 and 113. The L-shaped frame members 112 and 113 therefore form suitable yoke pieces or return pole-pieces for the magnets. The armature 197 has a projection or member 203 bent at practically right angles to the armature proper towards the rear of the structure outside of the frame member 12. To the end of the member 203 is secured an outwardly projecting stud or bar 204 which extends between the snubbing springs 206 and 207. These snubbing springs project toward the rear of the structure and are secured to the rear of a special off-normal spring mounting bracket 208 as shown in Fig. 9. The off-normal spring pile-ups mounted on the bracket 208 are located on the upper and lower sides of the stud 204. The upper pile 210 is controlled by the rotation of the bar 192 in the counterclockwise direction, looking at Fig. 9 and the lower pile-up 211 is controlled by the rotation of the bar 192 in a counter-clockwise direction.

Referring now to the operation of this switch, to establish a connection between the individual strips in any vertical row of contact strips and any set of corresponding horizontal contact strips in any row requires the operation of a corresponding horizontal bar in a clockwise or counter-clockwise direction and a corresponding vertical bar. A connection, for example, with the upper set of horizontal strips and the vertical contact strips may be established by first operating the horizontal bar 192 in the clockwise direction by the energizing of magnet 199. This will place an obstruction finger 215 of bar 192 in a position in front of the spring 160 of the upper set of horizontal contact strips. Then the vertical bar 179 is rotated in a counter-clockwise direction by the energization of the vertical magnet 174. The rotation of the vertical bar 179 causes the member 189 to press the obstruction finger 215 against the spring 160 which causes all of the strips 131 to make contact respectively with the corresponding vertical strips 141 at projections 150. It should be noted, of course, that the rotation of any other vertical bar would have caused the associated horizontal set of contact strips to engage with the corresponding vertical set of contact strips in the associated row. After the vertical bar 179 has operated it will maintain the obstruction fingers 215 in the engaged position, although the horizontal bar 192 may be returned to its normal position. The return of the horizontal bar will place the remaining obstruction fingers 215 of this bar in a neutral position and this bar may now be used to initiate connections at other points. If the horizontal bar 192 had been moved in the opposite direction the lower horizontal row of horizontal contact strips would have been selected. The fingers 215 are tensioned to bear against the edge of member 189 in the slot 90 and the slot 190 is of such width that it will confine the upward and downward movements of the finger 215 to the proper upper and lower position in front of the springs 60 of the corresponding groups of contact strips. It is therefore evident that only half the number of horizontal bars to that of the vertical bars are required. Ten vertical bars and five horizontal bars may be provided. To release an established connection at a cross-point all that is required is for the release of the actuated magnet 174 to return the associated vertical bar 179 to normal position. It will thus be seen that in the switch illustrated a total of ten connections may be established in succession and maintained simultaneously among the one hundred points at which connections may be made.

Referring now to the methods of manufacturing frame structures of these types, the cross-bar switch frame structure shown in Figs. 1 to 5 may be manufactured in the manner illustrated in Figs. 10 and 12. The pole-pieces 2 and 4 and the frame members 7 and 6 and the partitions 8 and 9 may be cut to dimensions within ordinary commercial limits and slightly shorter than the desired measurements of the frame. That is, when these members are placed in their proper positions in the jig fixture ready for welding together, the members 2, 8 and 9 may be cut slightly shorter than the distance between members 7 and 4 and the member 6 may be cut slightly shorter than the distance between the inside edge of member 7 and the outside edge of member 4. This jig fixture is provided with lugs 301 and 302 to space the members 2 and 8 in proper relation to each other and to the other members of the frame and these frame members may be clamped to these lugs by means of screws 303, 304 and 305 extending through projections 306, 307 and 308, respectively, of the jig fixture 300. To space the members 4 and 7 in their proper positions lugs 310, 311, 312 and 313 are provided, and these members are clamped against the lugs by means of screws, such as 314, 315 and 316 extending through projections 317, 318 and 319, respectively, of the jig fixture 300. Similarly, the members 6 and 9 may be spaced and located by lugs 320 and 321 and clamped thereto by screws 322, 323 and 324 extending through projections 325, 326 and 327, respectively, of the jig fixture 300. As the members 2 and 8 are cut slightly shorter than the distance between the members 4 and 7, there will always be a clearance between the ends of these members and the inside surfaces of members 4 and 7 at points 330 and 331 regardless of the commercial variation in the measurements of individual members. Similarly, the member 9 will have a clearance between the members 4 and 7 at points 332 and 333, while the member 6 will not touch members 7 and 4 at points 336 and 337.

When all the members are thus placed in the jig fixture 300 they may be welded at the points 330, 331, 332, 333, 336 and 337 in any well known manner. That is, welding material may be placed at the points where the members are to be welded and the parts heated until the welding material flows and fuses the members together. It may not always be necessary to weld these members together at their entire edges that meet but merely at portions of these edges to provide a sufficiently rugged structure.

By carefully machining the lugs 301, 302, 310, 311, 312, 313, 320 and 321 the various frame members may be placed in extremely accurate relations to each other as far as the critical measurements are concerned such as distances between the inside edges of members 4 and 7, between the inside edges of the members 2 and 8, between inside edges of members 8 and 9 and between the inside edges of members 9 and 6. By this method of manufacturing the frame structure, very accurate measurements may be secured without having to cut the various parts to any closer measurements than ordinary commercial limits, such as are secured by shearing, sawing, or any other method of cutting the parts. Fig. 12 is a perspective view of a corner of the parts 2, 8 and 7 and the jig fixture 300 and shows how the fixture may be constructed to obtain the desired results. It should be noted that the corners of the base plate of the fixture are cut out to allow free access to the ends of the frame members by the welding tools.

It is evident that any other form of jig fixture accomplishing these results may be employed as long as the surfaces to which the various members are clamped are in proper relation to each other to obtain the desired accurate dimensions.

In manufacturing the frame for the cross-bar switch shown in Figs. 8 and 9 a jig fixture such as that shown in Fig. 11 may be employed. This fixture is numbered 400 and provided with lugs or projections 401, 402, 403 and 404 to which the parts 110, 111, 112 and 113 may be clamped by means of screws such as 410, 411, 412 and 413 extending through projections 414, 415, 416 and 417 respectively of the jig fixture 400.

Fig. 13 shows how the member 112 fits into the member 111 to provide a clearance all around the edge 420. The members 112 and 113 are for this purpose cut slightly shorter than the distance between the members 110 and 111 so as to provide the proper clearance at the points 420, 421, 422 and 423. The members 110 and 111 on the other hand may be cut slightly longer than the distance between the outside edges of the members 112 and 113 when placed in the jig fixture. This construction provides pockets for the welding fluid when applied to the points 421 to 423.

It is evident that these members need not be welded over the entire adjacent edges but only at suitable portions thereof to produce a rugged structure.

What is claimed is:

1. The method of manufacturing a frame structure for telephone switches comprising U-shaped pole-pieces, partition members and L-shaped members, said members requiring very accurately dimensioned distances between them for the accurate locating and mounting of switching units on and between said members, comprising cutting the lengths of said members without any great accuracy but to dimensions allowing spaces between the members when assembled to form the frame structure at such places where the members are to be joined together, said members being so cut that at the places where they are to be joined together pockets are formed for the welding fluids to be applied and said pockets being so located that welding fluid applied in said pockets will not interfere with or affect the proper locating or working of the switching units, placing said members in a jig fixture that secures them in proper positions with great accuracy and welding the members together at portions of the pockets where the spaces appear.

2. The method of manufacturing a frame structure for telephone switches having a left-hand vertical side comprising a magnet structure including a U-shaped member and a flat partition member, a right-hand vertical side comprising an L-shaped member and a flat partition member, a lower horizontal side comprising a magnet structure including a U-shaped member and an upper horizontal side comprising a flat member, comprising cutting the left-hand vertical side members within commercial limits to slightly less than the distance between the inner surfaces of the two horizontal side members, cutting the flat partition member of the right-hand vertical side to the same dimension, cutting the L-shaped right-hand side member to a dimension within commercial limits slightly less than the distance between the inner surface of the upper horizontal side and the inner surface of the outer shank of the lower side member, cutting the upper horizontal member within commercial limits to a dimension slightly less than the distance between the outer surface of the left-hand vertical U-shaped member and the inner surface of the right-hand vertical L-shaped member, cutting the lower horizontal U-shaped member to the same dimension as the upper horizontal member, placing all of said members in a jig fixture of such dimensions that the distance between the horizontal members and between the vertical members correspond with the exact dimensional requirements for the working surfaces of the members when the frame is completed and so placing said members that at the juncture thereof a slight space appears and pockets are formed external to said working surfaces and welding said members together at the junctures with the welding fluid deposited in said pockets.

3. The method of manufacturing a frame structure requiring accurate dimensions in regard to the distance between its sides on the inside of the frame structure, this frame structure comprising two U-shaped horizontal members and two L-shaped vertical members, comprising cutting the horizontal members to any dimensions larger than the outside dimension between the vertical sides, cutting the vertical sides sufficiently shorter within ordinary commercial limits when the horizontal members are placed in proper positions so that a slight opening will always appear where they are to be joined to the vertical members and sufficiently narrower than the inside dimension between the two horizontal sides of said U-shaped member, so that a slight opening will always appear where they are to be joined to the vertical members, placing said members in a jig fixture of very accurate dimensions so that slight spaces will appear at the junctures of said members and pockets formed at said junctures outside the frame structure for the deposit of welding fluid which will not interfere with the working surfaces inside of the frame structure, and welding the members together by applying welding fluid in said pockets where the spaces appear.

4. The method of manufacturing a frame structure having U-shaped frame members, other frame members, said members requiring very accurately dimensioned distances between them for the accurate mounting of switching units on said members, comprising the cutting of said members without any great accuracy but to dimensions allowing spaces between the members when assembled to form the frame and to dimensions allowing pockets to be formed for welding fluid when the members are assembled and at such places as not to have welding fluid when applied interfere with the working spaces of said frame for said switching units, placing said members in a jig fixture in position to accurately locate the members and the surfaces of said members and welding said members together at portions of the pocket formed by said members for this purpose.

JOHN N. REYNOLDS.